United States Patent [19]

Menegatto

[11] 4,257,220

[45] Mar. 24, 1981

[54] SHOCK-ISOLATING, MOVABLE MOUNTING FOR TEXTILE MACHINE SPINDLES

[75] Inventor: Carlo Menegatto, Milan, Italy

[73] Assignee: O.M.M. Officine Meccaniche Menegatto S.p.A., Milan, Italy

[21] Appl. No.: 30,435

[22] Filed: Apr. 16, 1979

[30] Foreign Application Priority Data

Apr. 19, 1978 [IT] Italy .................... 22462 A/78

[51] Int. Cl.³ .............................................. D01H 7/22
[52] U.S. Cl. ................................................. 57/89
[58] Field of Search ................................. 57/88, 89

[56] References Cited

U.S. PATENT DOCUMENTS

| 2,321,664 | 6/1943 | Elvin et al. | 57/89 |
| 2,433,987 | 1/1948 | Gleitz et al. | 57/89 |
| 2,497,865 | 2/1950 | Cochran | 57/89 |
| 2,532,261 | 11/1950 | Miller et al. | 57/89 |
| 2,648,948 | 8/1953 | Soussloff et al. | 57/89 |
| 2,890,564 | 6/1959 | Keith et al. | 57/89 |
| 3,251,180 | 5/1966 | Klein | 57/89 |
| 3,292,358 | 12/1966 | Di Meglio et al. | 57/89 |
| 3,815,348 | 6/1974 | Wachendorf et al. | 57/89 X |

*Primary Examiner*—John Petrakes
*Attorney, Agent, or Firm*—Fleit & Jacobson

[57] ABSTRACT

Disclosed herein is a shock-isolating mounting for textile machinery spindles, which comprises a mobile resting block for the spindle with hinging components designed in order to move the spindle from an upright position, in which the spindle is in contact with a control belt, to an inclined position, in which the spindle is in contact with a brake; the above hinging components comprise some hinging units made of elastomeric material and a toggle-jointed thrust element connected in said manner to one of the aforementioned hinging components.

7 Claims, 5 Drawing Figures

SHOCK-ISOLATING, MOVABLE MOUNTING FOR TEXTILE MACHINE SPINDLES

BACKGROUND OF THE INVENTION

This invention relates to a shock-isolating, movable mounting device, for textile machine spindles, for instance for coiling and twisting machines and similar ones.

DESCRIPTION OF PRIOR ART

At present textile machine spindles are supported in pre-established positions along special frames without it being possible to move or shift the spindle itself relative to the textile machine frame.

The fixed upright arrangement of the spindles makes it hard to replace the cops by means of automatic mechanisms which require considerable headroom for the doffing of the cops themselves; this entails not just a machine of greater dimensions, but greater manufacturing costs too.

The fixed arrangement of the spindles renders their replacement also difficult in view of the proximity of the tangential control belt; the stopping of the spindle for its replacement or in order to replace the cop causes some trouble to the near-by spindles too since the disjunction of the tangential belt from a spindle alters the belt contact pressure and hence the control velocity for the adjoining spindles.

It is furthermore desirable to insulate each spindle to the utmost possible degree in order to absorb or reduce the vibrations which otherwise would be transmitted to the structure or frame of the textile machine.

In the past it has been suggested to provide a spindle mounting capable of rotating towards the outside of the machine upon an axis which is vertical and parallel to the axis of the spindle itself. Such an arrangement only partially solves the problem relative to the replacement of spindles and cops, since the upright position of the spindles still entails headroom problems; moreover the adoption of said mounting causes some difficulty in maintaining the right pressure of the tangential control belt. Finally the adoption of normal metal hinges has not solved entirely the problem relative to the complete insulation of the spindles, but rather it has worsened it due to the continuous wear which the metal hinge was subjected to over a length of time.

SUMMARY OF THE INVENTION

The object of this invention is therefore to supply a mounting for the spindles of a textile machine, by means of which it is possible to solve simultaneously both the problem relating to the complete dampening of vibrations, and the problem relating to the replacement of the spindles and cops themselves without influencing the adjoining spindles.

In accordance with the invention one has therefore provided a shock-isolating mounting for textile machine spindles which comprises: a mobile spindle bearing and the components which are necessary to hinge the bearing to the frame of the machine in order to turn the spindle over from an upright working position, where the spindle is in contact with a tangential control belt, to an inclined standing position, where the spindle is disengaged from the belt and is in contact with a braking device; said hinging components comprise at least a first hinging unit, made of elastomeric material, which defines a fixed horizontal axis, as well as at least a second hinging unit, made of elastomeric material, which defines a mobile horizontal axis which is parallel to the aforementioned one; a thrust unit which is hinged on the one side to the machine frame and which is toggle-jointed on the other side to the second above-mentioned hinging unit; one or more shock-isolating components, made of elastomeric material, which are interposed between one part of the mounting device and a fixed stopping surface in order to insulate the spindle completely in its working position.

Thanks to the above-mentioned shock-isolating bearing device one achieves the total insulation of the spindle vibrations from the spindle-carrying frame, and in general from the frame of the textile machine; hence the vibrations produced by possible unbalances of a spindle and/or a cop are no longer transmitted to the other spindles. Furthermore the movable resting device permits one to solve, in an extremely simple manner according to this invention, both the problem relating to the replacement of the cop in a limited amount of space available due to the inclined position which may be taken by the spindle, and the problem relating to the replacement of the spindle itself since the pulley of the latter detaches itself considerably from the tangential control belt without affecting the stretch of the belt itself.

BRIEF DESCRIPTION OF THE DRAWINGS

These as well as other characteristics of the shock-isolating, movable spindle bearing, according to this invention, shall be further illustrated hereinafter with reference to the figures of the drawings enclosed, of which.

DESCRIPTION OF THE PREFERRED EMBODIMENTS

Figure 1:
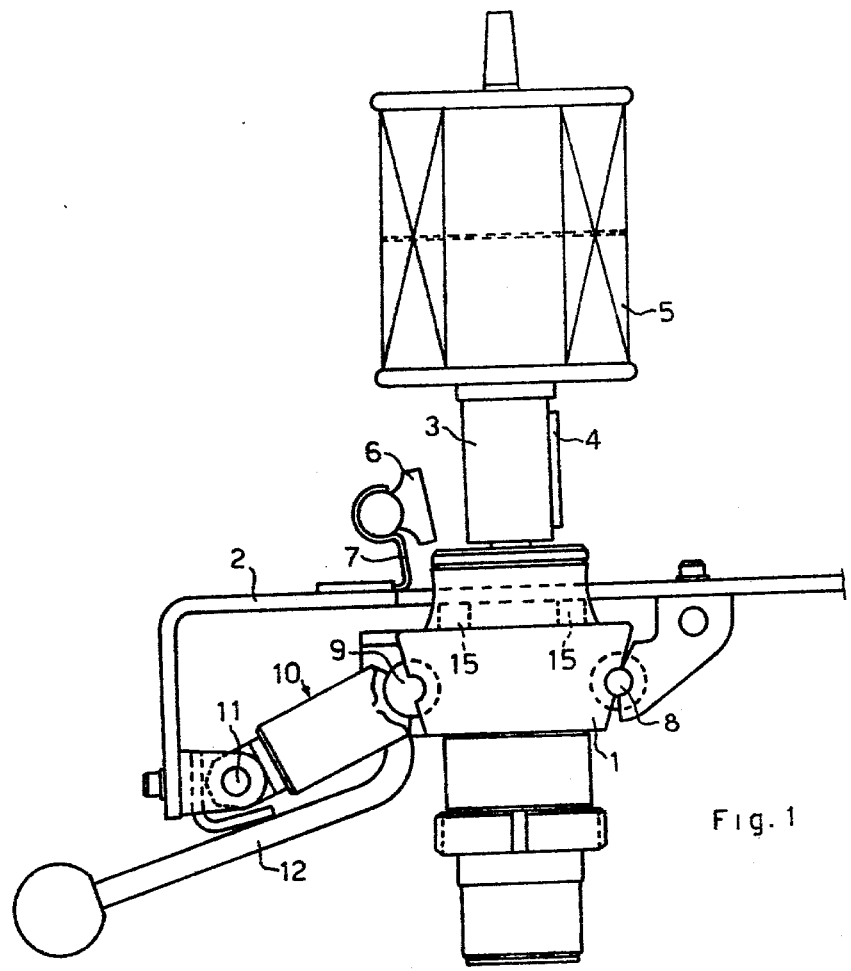
FIG. 1 is a side view of a first way of realizing the supporting device according to this invention, the spindle being in its upright working position.
Figure 2:
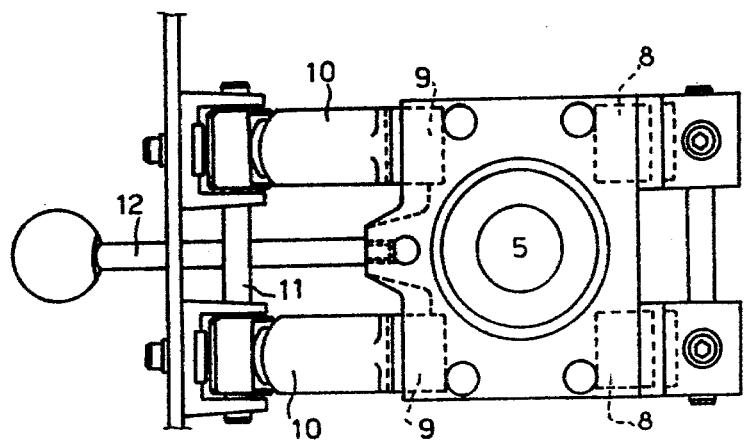
FIG. 2 is a plan top view of the supporting device of FIG. 1.
Figure 3:
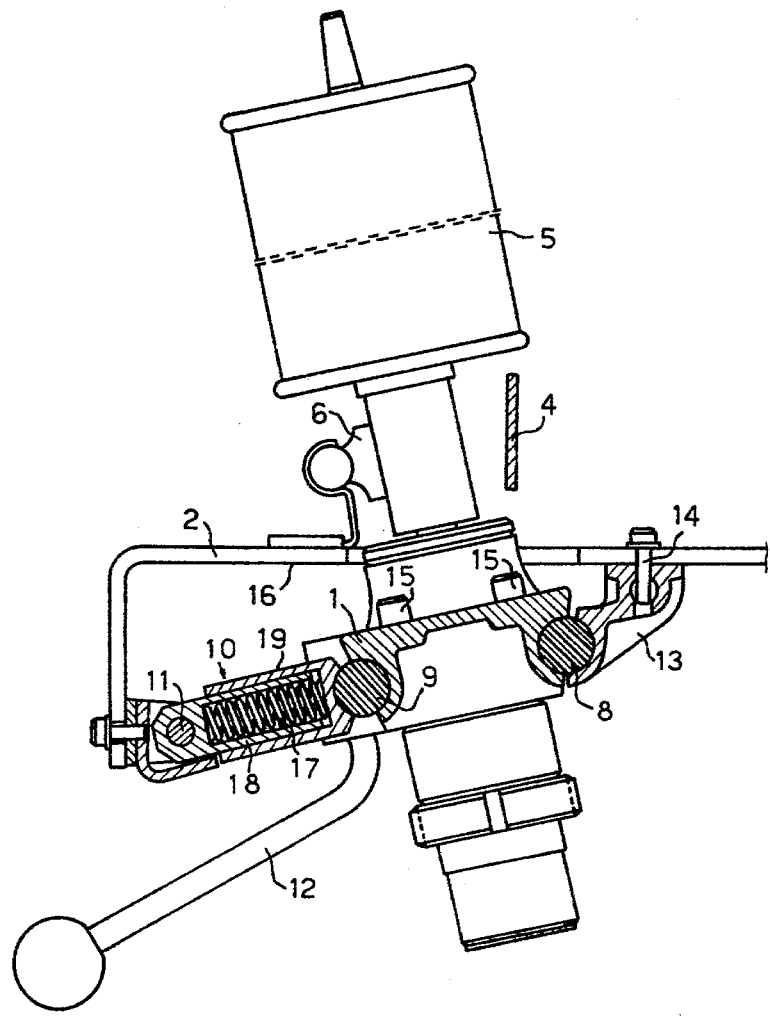
FIG. 3 is a side view, similar to that of FIG. 1, partly cutaway, and with the spindle inclined or moved in one of its resting positions.

With reference to FIGS. 1 to 3 there is described a first form of realization of the spindle-supporting device according to this invention.

As shown, the supporting device comprises a mobile block or ring 1 which is hinged to a spindle frame 2 of a textile machine, in order to support a spindle 3 which is controlled by a tangential belt 4; a yarn cop 5 is carried by spindle 3 as indicated.

On the side of the spindle which is opposite the one in contact with the tangential belt 4, there is a brake shoe 6 supported by an elastic bearing 7 fastened to the spindle-supporting frame 2 of the machine.

In particular, as shown in the figures, the spindle-supporting block 1 is placed beneath the spindle-carrying frame 2 and is hinged to the latter upon a fixed horizontal axis which is defined, in this specific case, by two hinging components 8, made of elastomeric material; the hinging components 8 are coaxial and lie on a plane which is parallel to and behind the plane of tangential belt 4.

Two further hinging units 9, made of elastomeric material, define a second mobile hinging axis on the opposite side of the previous one.

The supporting device also comprises one or more thrust units, indicated globally by 10, each of which is hinged in 11 to a fixed point of the spindle-supporting frame 2, while on the other side it is toggle-jointed to a respective hinging component 9 made of elastomeric material which defines the aforementioned mobile horizontal hinging axis.

The drawing comprises finally a control lever 12, secured, for instance, to spindle-carrying block 1 in order to control manually, or by means of an automatic device, the turnover of the spindle from its upright working position shown in FIG. 1, to its inclined idle position shown in FIG. 3. Such turnover is made possible by the toggle-jointed movement in relation to the mobile axis, thus making the hinging axes 8,9,11 switch from the arrangement shown in FIG. 1 where the mobile or intermediate axis 9 is at one side of the plane passing through axes 8 and 11, to the arrangement shown in FIG. 3 where the three axes lie on the same plane, namely, the intermediate axis 9 is to be found on the opposite side of the plane relative to the one previously defined.

In the case of FIGS. 1–3 one has pointed out a manual control for supporting one spindle only but, it is nevertheless apparent that one will be able to design a manual or automatic control for several spindles simultaneously according to one's requirements.

If the position of FIG. 3 is again examined, it will be observed that each hinging component 8 and 9, made of elastomeric material, is made up in this specific case by a cylindrical body which is partially fitted into a half-cylindrical housing produced on one side of the spindle-carrying block or ring 1. Similarly, each hinging component 9, made of elastomeric material, is constituted by a cylindrical body which is partly fitted into a half-cylindrical housing produced at one end of thrust component 10 and respectively on one side of spindle-carrying block 1 which is placed opposite the previous one.

In both cases it is to be observed that the opposing surfaces of bracket 13, of spindle-carrying block 1, and respectively of thrust component 10, are never in direct contact but rather diverge with respect to each other in both upward and downward directions, relative to said hinging axes; such gauge is indispensible in order to maintain some clearance between the opposing surfaces, which clearance is sufficient to avoid their direct contact which, otherwise, would produce the propagation of the vibrations caused by the rotation of the spindle. Therefore, the vibrations produced by spindle 3 which is rotating by means of tangential belt 4 are totally dampened or absorbed by the elastomeric material hinging components 8 and 9, as well as by shock-isolating buffers or bearings 15 made of elastomeric material which intervene between a part of the supporting device, for instance, between spindle-carrying block 1 to which the aforementioned buffers are secured (FIG. 3) and a corresponding stop surface 16 of spindle-carrying frame 2 or of the textile machine.

In FIG. 3, the cutaway shows a particularly profitable form of realizing the thrust device 10; in this case thrust device 10 is elastically stressed by helical spring 17 against hinging component 9; each thrust component 10 is made up of a bush 18 hinged in 11 to frame 2, which may run telescopically relative to a bush 19 which is articulated to a respective component 9 of elastomeric material which defines the mobile hinging axis of the spindle bearing; it is obvious that, by adopting a spring 17 of suitable value and arranging the hinging axes at suitable pre-established distances, it is possible to obtain a thrust on supporting block 1, against surface 16 of the frame, which thrust is sufficient to keep spindle 3 firmly immobile in its upright working position shown in FIG. 1.

Briefly, the operation of the support device is as follows: in FIG. 1, the supporting device is shown during the spindle's working condition, namely, with spindle 3 standing upright in contact with tangential control belt 4. In this position, spindle 3 is made to rotate by belt 4 in order to uncoil the yarn off cop 5; it is readily apparent that under these conditions spindle 3 is supported in a totally insulated way from the rest of the machine since all possible vibrations of the spindle, produced for instance by unbalances of the yarn mass on cop 5, are dampened by elastomeric material hingings 8 and 9, as well as by the above mentioned insulating buffers 15. In the event of spindle 3 having to be stopped in order to replace it, or for ordinary servicing operations, as well as for the replacement of cop 5, it is sufficient to operate control lever 12 so as to press it downwards in order to turn the spindle over to the inclined position shown in FIG. 3. In fact, a downward pressure on lever 12 determines the rotation of the spindle-carrying block 1 around the fixed axis of the elastomeric material hinging components 8; such rotation takes place by overcoming the elastic reaction of the thrust component 10 as long as spindle 3 rests on brake 6 which stops it. In this position the spindle is considerably detached from the tangential control belt 4 having an inclined or fixed stop position since the three hinging axes supplied by components 8,9 and 11 are now coplanar, that is to say, the intermediate axis 9 is to be found on the opposite side of the aforementioned plane with respect to the previous position. It is obvious that the inclined arrangement of spindle 3 makes it easier to operate in order to disassemble and replace the spindle itself; it is also apparent that the arrangement of the spindle allows an inclined and front withdrawing of yarn cop 5 without interfering with possible overhead structures of the textile machine, for instance with a frame of overhead spindles.

Figure 4:
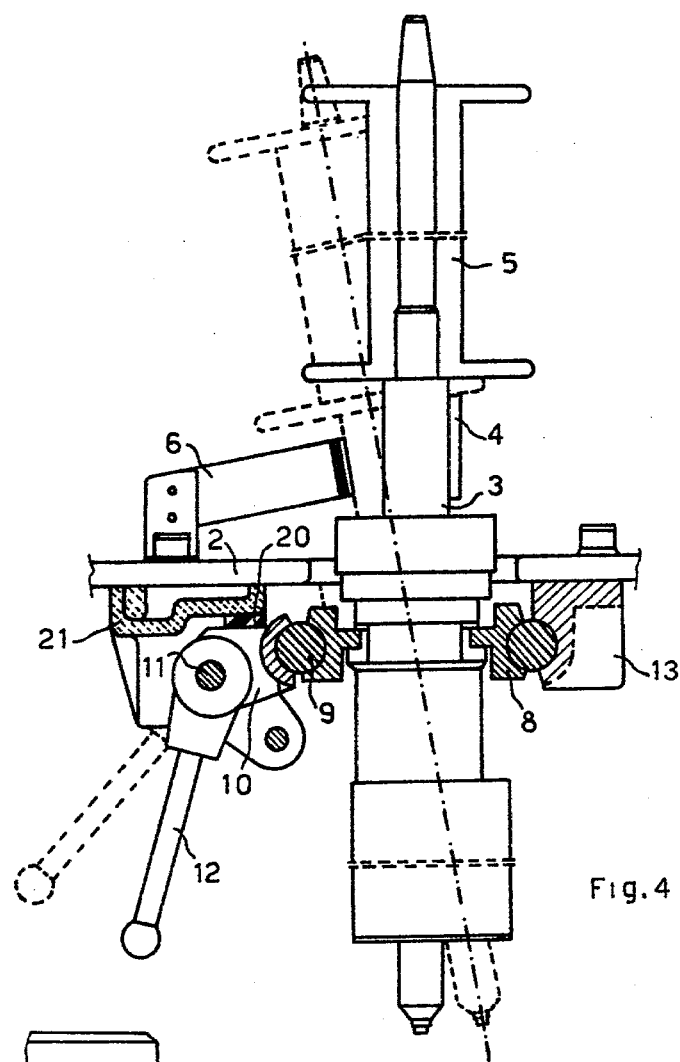
FIG. 4 is a partially cutaway side view of a second form of realization of the movable supporting device for spindles according to this invention.

FIG. 4 shows a simplified variation of the supporting device. In FIG. 4, one has employed the same numerical references as in previous figures to indicate similar or operationally equivalent components. Hence, also in the case of FIG. 4, the supporting block or ring 1 of spindle 3 is hinged, by means of a cylindrical component 8 made of elastomeric material, on the basis of a first fixed hinging axis. Furthermore, by means of another elastomeric material hinging component 9 which defines the mobile axis, it is toggle-jointed to thrust component 10 in the form of a lever which has its fulcrum 11 in the spindle-carrying frame 2 or a component which is integral with the latter. Number 1 again indicates a control lever, which in this case is integral with thrust lever 10. A shock-isolating bearing 20 is interposed between thrust lever 10 and a clasping component 21 which is above it. In the case of FIG. 4, unlike the previous case, the elastomeric material components 8 and 9, besides acting as a hinge and as shock-isolating components for the spindle's mounting, also supply the necessary elastic reaction in order to maintain block 1 with the spindle in a working position.

In the case of previous figures, the elastomeric material hinging components 8 and 9 were made of cylindrical bodies capable of producing a rotational type of hinge, that is to say, a hinge capable of allowing a relative rotation between the mounting components and the cylindrical components themselves.

Figure 5:
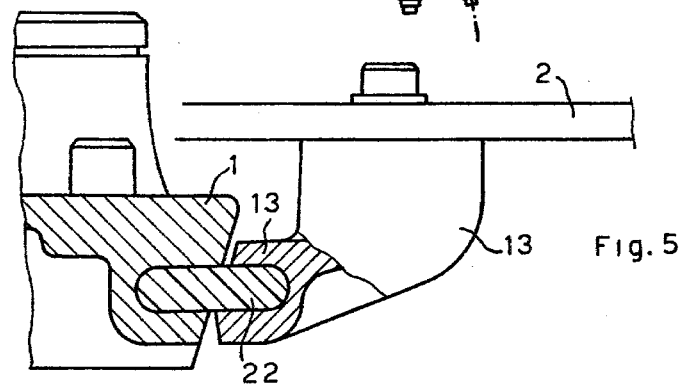
FIG. 5 is a partial view of a variation of the hinge.

Instead of the cylindrical components 8 and 9 made of elastomeric material, one may however use another type of hinging component, always made in elastomeric material; one may adopt, for instance, a component shaped like the one shown in FIG. 5, which would allow a flexing type of hinging, namely, one wherein the elastic flexing of the material itself is exploited in order to bring about a relative rotation, for instance of spindle-carrying block 1 in respect of supporting bracket 13, in the manner shown.

It is however apparent that what has been said and shown in the drawings enclosed has been supplied in order to exemplify the idea of the general solution entailed by this invention, which solution consists of a shock-isolating and overturning mounting for the spindles of a textile machine on the basis of which a spindle-supporting mobile block is hinged, with a toggle movement, by means of elastomeric material hinging components such as synthetic rubber or other similar materials, which are capable of acting as dampening or shock-isolating components, thus preventing any direct contact whatsoever between the spindle-supporting block 1 and the other clamping components of the textile machine.

What is claimed:

1. A shock-isolating mounting for textile machine spindles, said textile machine having a frame, said spindle having a spindle axis, said mounting comprising:
   a spindle-carrying block defining a main plane thereof perpendicular to said spindle axis, and components for hinging the spindle-carrying block to the frame of the textile machine in order to turn over the spindle from an upright working position, wherein the spindle is in contact with a tangential control belt, to an inclined idle position, wherein the spindle is detached from the belt and is in contact with a braking device;
   said components for hinging comprising at least a first hinging component, made of elastomeric material, which defines a fixed horizontal axis, as well as at least a second hinging component, made of elastomeric material, which defines a horizontal axis which is mobile and parallel to the fixed horizontal axis;
   a thrust component having one side hinged to one side of the machine frame and having another side toggle-jointed to said second hinging component; and
   at least one shock-isolating component, made of elastomeric material, interposed between one part of the spindle-carrying block and a fixed stop surface.

2. A mounting according to claim 1, wherein the thrust component comprises an axial reaction spring.

3. A mounting according to claim 1, wherein said thrust component includes a first bush which is toggle-jointed to the mobile axis of the spindle-carrying block and a second bush which slides relative to the first bush and which is hinged in a fixed point of the machine frame; further comprising a helical reaction spring interposed between said first and second bushes.

4. A mounting according to claim 1, wherein said first and second hinging components made of elastomeric material comprise a cylindrical body and define hinges of a rotational type.

5. A mounting according to claim 1, wherein said first and second hinging components are made of an elastomeric material section, which defines a flexing type of hinge.

6. A mounting according to claim 1, comprising a bracket supporting said first hinging component, and wherein the spindle-carrying block, the bracket supporting the first hinging component, and the thrust component, respectively, provide oppositely diverging surfaces on both sides of the hinging axis.

7. A mounting according to claim 1, wherein the tangential control belt defines a plane thereof, and wherein the first hinging axis is positioned beneath the tangential control belt and on a plane which lies behind the plane of the tangential control belt.

* * * * *